Nov. 18, 1941.   D. E. GRAY   2,263,127
GLASS CHARGING AND PRESSING APPARATUS AND METHOD
Filed March 3, 1938

INVENTOR.
DAVID E. GRAY
BY Dorsey, Cole & Harner
ATTORNEYS.

Patented Nov. 18, 1941

2,263,127

UNITED STATES PATENT OFFICE 2,263,127

GLASS CHARGING AND PRESSING APPARATUS AND METHOD

David E. Gray, Corning, N. Y., assignor to Corning Glass Works, Corning, N. Y., a corporation of New York Application March 3, 1938, Serial No. 193,779

13 Claims. (Cl. 49—5)

The present invention relates to methods and apparatus for pressing glass. In all past methods of pressing glass articles with which applicant is familiar, in order to reduce the chill marks to a minimum, the temperature of the mold is maintained as high as possible and still avoid sticking of the glass in the mold. In the conventional methods of pressing, a gob of glass is introduced into a mold followed by a suitable shaping plunger. Ware pressed in this manner, however, is usually found to have chill marks in the region of the area in the mold first covered by the gob. These chill marks are caused by a formation of a skin on the edges of the gob next to the mold while the glass is standing, just before pressing. During this time the skin becomes of such strength that when it is pressed down against the mold it moves in steps as compared with a perfectly smooth continuous rolling motion characteristic of skin free glass. These steps are due to breaking or localized bending of the skin which has become set up to such a degree that no amount of pressure will wholly eradicate them.

The effect upon the molds of this method of pressing is to subject the central portion, or that part which is in contact with the glass the longest, to a wide range of temperature variations resulting in violent expansion and contraction without similar treatments to the rest of the mold. The result is that this central portion is intermittently subjected to very great compressive force as it tends to expand, but is held in position by the cold portion which surrounds it. Metal fatigue necessarily ensues rapidly.

Furthermore, because of the necessity of running the molds at a high temperature the loss of heat from the glass to the mold is appreciably retarded and therefore the setting up time is prolonged and the number of pieces of ware produced per mold in a given time is limited. Because of the metal fatigue of the mold, the total number of pieces of ware produced by a mold before failure thereof is also limited. Also, because of the relatively slow motion of the glass in the mold and the rapid loss of heat, a large amount of glass is required to fill up the mold, resulting in thick walled ware.

It is the primary object of the present invention to press glass articles in such a manner that the chill marks, ordinarily resulting from too long a contact of the gob with the mold prior to pressing, are prevented.

Another object is a method of pressing which subjects the metal of the mold employed to a minimum of fatigue, thereby obtaining maximum mold life.

A further object is a method of pressing ware with thinner walls than permitted by past pressing methods, thereby reducing to a minimum the time for the glass to set up in a mold, and accordingly permitting the maximum number of pieces to be pressed per unit of time.

These objects are realized by pressing the glass in such a rapid manner that its final form is attained before the glass has given up any material portion of its heat or an appreciable skin has formed on its surface and holding the fully pressed article between the mold parts until the glass has become fully set up by transmission of its heat to the pressing surfaces. By this method an article reaches final form before any part of the glass has had time to become set and, accordingly, no chill marks are formed. Also, since the charge of glass is spread out over the entire pressing surfaces before any appreciable heat is given up by the glass, such heat is uniformly distributed over the entire pressing surfaces and, accordingly, violent expansion and contraction of one mold surface area relative to another is avoided. Furthermore, since the glass reaches its final shape before giving up any appreciable amount of its heat a thinner article can be pressed than by the conventional method.

The invention embodies among its features a pair of mold elements supported and rapidly actuated by a system of cam actuated levers to seize a falling gob of glass and press it into a desired final shape; and of an electromagnet which holds the pressed articles between the mold elements for the period necessary to effect the desired setting up of the glass.

The preferred form of the invention is illustrated in the accompanying drawing in which.

Figure 1:
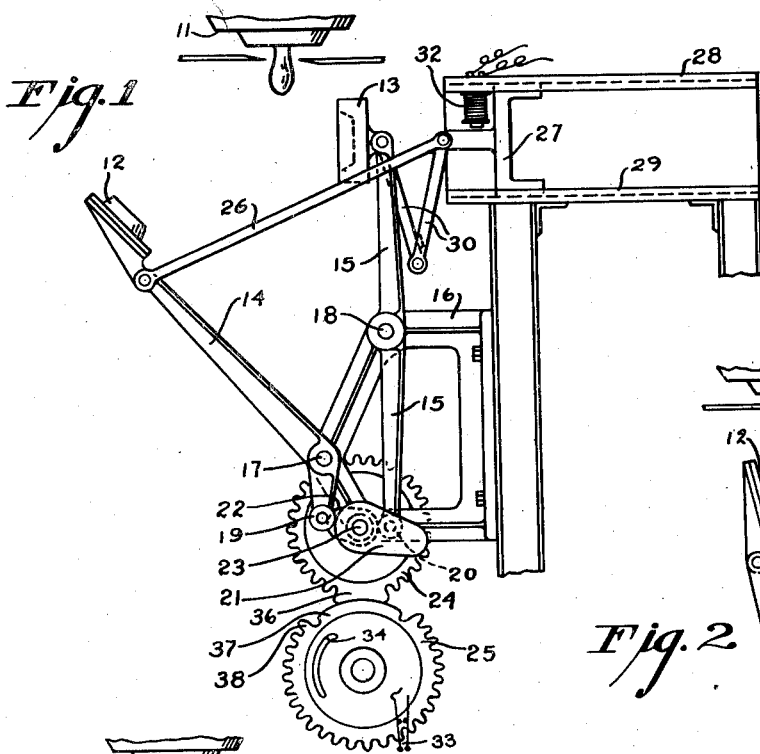
Fig. 1 is a side elevation of the apparatus illustrating the mold elements in their fully open position and in receiving relation to a diagrammatically illustrated feeder.

In the embodiment of the invention illustrated, 11 designates a gob feeder which may be of any conventional type properly timed to feed gobs of glass to the pressing apparatus as is the usual practice. Mold members 12 and 13 are mounted on the upper ends of levers 14 and 15 pivoted on a frame 16 at points 17 and 18. The lower ends of these levers carry rollers 19 and 20 constituting cam followers. The roller 19 is engaged by a cam 21 and the roller 20 by a cam 22. Both of these cams are fixed to a shaft 23 intermittently rotated by an intermittent motion spur gear 24 driven by continuously rotating gear 25.

A connecting rod 26 connects lever 14 with a crosshead slide 27 which runs in suitable guideways 28 and 29. Mounted between slide 27 and the upper end of lever 15 is a relatively heavy toggle 30 so arranged that, when mold members 12 and 13 have arrived at the final forming position, the toggle will be straight between slide 27 and the mold 13. Further upward movement of the toggle is positively prevented by an armature 31, carried by the toggle, coming into engagement with the core of an electromagnet 32.

Considering the operating characteristics of the apparatus, it will be observed that the contour of cam 21 is such that the mold member 12 will be forced to travel through a large arc about pivot 17 at a rapidly accelerating speed, whereas the contour of cam 22 is such that the arc of travel and speed of acceleration of mold member 13 is relatively small, the main purpose of cam 22 being to limit the movement of mold 13 to the right while toggle 18 is in the folded position.

Figure 2:
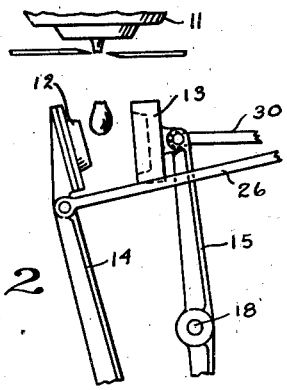
Fig. 2 is a view of parts of Fig. 1, illustrating their position just prior to seizing a falling gob.
Figure 3:
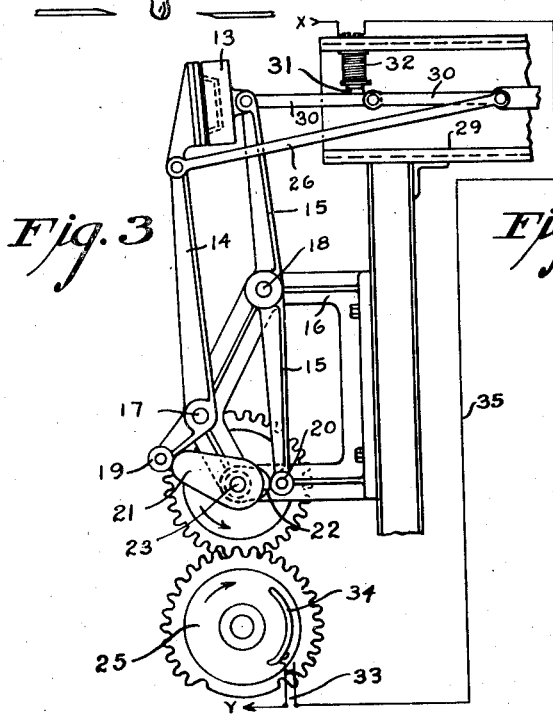
Fig. 3 is a view similar to Fig. 1 but showing the mold elements just as they have been brought to their closed position by their associated cams.
Figure 4:
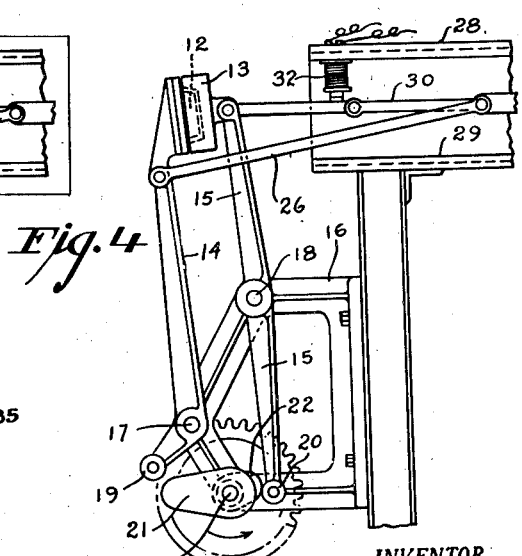
Fig. 4 is a view similar ot Fig. 3 but with the cams slightly advanced and the mold elements being retained in their closed position by the holding magnet.

The timing of the release of a gob of glass by the feeder is such that the contacting of member 12 with the gob will occur when the mold member 12 has attained its full speed, which occurs a moment after the position illustrated in Fig. 2 is attained, the velocity of member 12 being ample at this time to arrest the downward motion of the gob and to carry it on the face of mold member 12 into mold member 13. Owing to the high speed at which mold member 12 and its driving lever 14 are traveling at this time, the associated connecting rod 26 also imparts a high speed of movement to slide 27 causing the toggle 30 to straighten up rapidly, its motion accelerating very rapidly especially as it approaches the straight line. For best results the weight of toggle 30 must be such that its inertia will furnish great force as the mold members 12 and 13 approach their final position.

The period of dwell of the mold members in their final position is controlled by magnet 32 which becomes energized just before the mold members arrive at their final position and holds the toggle 30 in its straight line position until the glass has been properly set up.

As diagrammatically illustrated, the circuit for magnet 32 is under control of contact springs 33 actuated by a cam 34 on the surface of gear 25. This cam is of such length that it holds springs 33 closed while gear 25 is rotating through an arc of approximately 100°. The circuit for the magnet extends from terminal X of a suitable current source (not shown) through magnet 32, conductor 35 and contact springs 33 to the terminal Y of the same current source.

The circuit for magnet 33 is interrupted at a time that cams 21 and 22 are in a position to permit the toggle to drop to the position illustrated in Fig. 1, thereby effecting the full opening of the mold members. At this time the teeth 36 and 37 of gears 24 and 25 are about to mesh and accordingly the mold members remain fully open until commencement of their closure is started as tooth 38 of gear 25 engages tooth 36. This period of dwell of the mold members in their maximum open position is utilized to permit the release of the finished ware from the mold members onto a suitable conveyor (not shown) before commencement of a subsequent molding cycle.

I claim:

1. The method which includes seizing and pressing a falling charge of plastic glass into final form between pressing surfaces rapidly moving toward one another at different velocities.

2. A method which includes arresting the downward movement of a falling charge of glass by laterally moving it by one shaping element into engagement with another shaping element moving in the opposite direction to the first to shape the charge into a finished article and then holding the article to its finished shape between the two shaping elements until the glass becomes set.

3. The combination with means for releasing charges of glass from a parent supply body, of a glass pressing apparatus, including a mold assembly, a plunger assembly, levers interconnecting said assemblies, and means for simultaneously actuating said levers to move said assemblies toward one another in directions transverse to the direction of movement of a released charge and to move at least one of said assemblies over a path intercepting that of the charge.

4. In a glass press, two levers each pivoted intermediate its ends and each having a pressing member supported on one end thereof, means cooperative with the other end of one of said levers to move its pressing member about a relatively short arc towards the other pressing member, and means cooperative with the corresponding end of the other lever to move its member about a comparatively long arc toward the other pressing member and until said pressing members meet.

5. In a glass press, two levers each pivoted intermediate its ends and each having a pressing member supported on one end thereof, means cooperative with the other end of one of said levers to move its pressing member about a relatively short arc towards the other pressing member, and means cooperative with the corresponding end of the other lever to move its member about a comparatively long arc toward the other pressing member and until said pressing members meet, a slide member, a folded linkage between one of said levers and said slide member adapted when fully unfolded to hold said pressing members in meeting relation, and a rigid linkage between said slide members and the other of said members for moving said slide member during the movement of said members towards one another as required to fully unfold said first linkage coincident with the meeting of said members.

6. In a pressing assembly, two pressing units arranged to move toward one another into pressing relation, means for moving the first unit over a relatively long path toward the second at a rapidly accelerating speed, and means for moving the second unit over a relatively short path toward the first unit at a lesser accelerating speed.

7. The method of forming glassware, which includes severing a mold charge from a parent body of molten glass, engaging one side of the mold charge with a mold member as the charge leaves the parent body, moving the mold charge in an arcuate path which intersects its initial path of movement and engaging the opposite side of the mold charge near the end of its arcuate movement with a mold member to press the charge into the desired shape.

8. The method of pressing glassware, which includes severing a mold charge suspended from a parent body of molten glass, moving the mold charge transversely of its initial direction of movement as it leaves its point of severance, halting the transverse movement of the charge and pressing it into the desired shape while such transverse movement is being brought to a halt.

9. The method which includes intercepting and halting the fall of a charge of glass substantially immediately after its severance from a parent supply body by striking it a blow with a shaping surface moving in a direction transverse to its path of fall and halting its movement by bringing it into contact with a second shaping surface.

10. The method which includes freeing a suspended charge of plastic glass from a parent supply body and intercepting the charge and subjecting it to the forming action of pressing surfaces moving toward one another in directions transverse to the path of travel of the charge.

11. The method which includes freeing a suspended charge of plastic glass from a parent body, thereafter striking and in part shaping the freed charge by a moving shaping surface before movement of the charge as a whole ceases and of completing the shaping of the charge into a finished article by subjecting it to the action of another moving shaping surface also before movement of the charge as a whole ceases.

12. The method which includes freeing a descending charge of plastic glass from a parent supply body, intercepting and changing the direction of movement of the charge by a rapidly moving shaping surface, and halting the movement of the charge by its engagement with a second shaping surface moving toward the charge.

13. The combination with means for releasing charges of glass from a parent supply body, of a glass pressing apparatus including a pair of arms each supporting a pressing unit, and means for simultaneously actuating said arms to move their pressing units toward one another in directions transverse to the direction of movement of a released charge and to move at least one of said units over a path intercepting that of the charge.

DAVID E. GRAY.